(12) United States Patent
Lorini

(10) Patent No.: US 10,375,032 B2
(45) Date of Patent: Aug. 6, 2019

(54) SYSTEM AND METHOD FOR DATA SEGMENTATION AND DISTRIBUTION ACROSS MULTIPLE CLOUD STORAGE POINTS

(71) Applicant: Thomas Lorini, Santa Ana, CA (US)

(72) Inventor: Thomas Lorini, Santa Ana, CA (US)

(*) Notice: Subject to any disclaimer, the term of this patent is extended or adjusted under 35 U.S.C. 154(b) by 0 days.

(21) Appl. No.: 15/400,955

(22) Filed: Jan. 6, 2017

(65) Prior Publication Data

US 2017/0193233 A1    Jul. 6, 2017

Related U.S. Application Data

(60) Provisional application No. 62/275,689, filed on Jan. 6, 2016.

(51) Int. Cl.
| | |
|---|---|
| *H04L 29/06* | (2006.01) |
| *G06F 16/27* | (2019.01) |
| *G06F 21/62* | (2013.01) |
| *H04L 29/08* | (2006.01) |
| *H04L 12/26* | (2006.01) |

(52) U.S. Cl.
CPC .......... *H04L 63/0428* (2013.01); *G06F 16/27* (2019.01); *G06F 21/6218* (2013.01); *H04L 63/062* (2013.01); *H04L 43/0864* (2013.01); *H04L 43/0882* (2013.01); *H04L 67/1097* (2013.01); *H04L 67/42* (2013.01)

(58) Field of Classification Search
CPC ......... G06F 17/30082; G06F 17/30094; G06F 17/30174; H04L 63/0428
See application file for complete search history.

(56) References Cited

U.S. PATENT DOCUMENTS

| | | | | |
|---|---|---|---|---|
| 6,374,336 | B1* | 4/2002 | Peters | G06F 11/1076 348/E5.008 |
| 9,276,973 | B2* | 3/2016 | Lyren | H04L 65/403 |
| 9,405,926 | B2* | 8/2016 | Lewis | G06F 21/6218 |
| 2002/0103907 | A1* | 8/2002 | Petersen | G06F 11/1464 709/226 |
| 2007/0067332 | A1* | 3/2007 | Gallagher | G06F 21/6227 |
| 2013/0117462 | A1* | 5/2013 | Ganesan | H04N 7/17336 709/231 |

(Continued)

OTHER PUBLICATIONS

H Gupta and V Sharma, Multiphase Encryption: A New Concept in Modern Cryptography, Aug. 2013, International Journal of Computer Theory and Engineering, vol. 5, No. 4, p. 638.*

(Continued)

*Primary Examiner* — Luu T Pham
*Assistant Examiner* — Edward X Long
(74) *Attorney, Agent, or Firm* — Kafantaris Law Offices; Theo Kafantaris

(57) ABSTRACT

The present invention is a system and method for data segmentation and distribution such that the user may distribute their data to a plurality of cloud-based storage points while maintaining data integrity and security. This is accomplished by incorporating a segmentation module, an encryption module, a distribution module, a rendering module, and a sharing module. These modules work in conjunction to distribute data over several cloud-based storage services while also providing security features and increased speed.

15 Claims, 7 Drawing Sheets

(56) References Cited

U.S. PATENT DOCUMENTS

| | | | |
|---|---|---|---|
| 2014/0019498 A1* | 1/2014 | Cidon | G06F 17/3007 |
| | | | 707/827 |
| 2014/0248912 A1* | 9/2014 | Snider | H04W 4/021 |
| | | | 455/456.3 |
| 2014/0281066 A1* | 9/2014 | Grube | G06F 3/067 |
| | | | 710/74 |
| 2016/0117102 A1* | 4/2016 | Hong | G06F 12/0253 |
| | | | 711/103 |
| 2016/0378864 A1* | 12/2016 | Mullins | G06F 17/30011 |
| | | | 707/770 |
| 2017/0206132 A1* | 7/2017 | Song | G06F 11/1076 |

OTHER PUBLICATIONS

Chen et al., SecureDropbox: A File Encryption System Suitable forCloud Storage Services, Proceedings of the 2013 ACM Cloud and Autonomic Computing Conference, Miami, FL, USA, Aug. 5-9, 2013. (Year: 2013).*

Schnitzer el al., Secured Storage using SecureParser, 2005, 2005 ACM workshop on Storage security and survivability, pp. 135-140, Fairfax, VA, USA (Year: 2005).*

* cited by examiner

SYSTEM AND METHOD FOR DATA SEGMENTATION AND DISTRIBUTION ACROSS MULTIPLE CLOUD STORAGE POINTS

CROSS-REFERENCE TO RELATED APPLICATIONS

This application claims the benefit of U.S. Provisional Patent Application No. 62/275,689, filed on Jan. 6, 2016, and incorporated herein by reference.

STATEMENT REGARDING FEDERALLY SPONSORED RESEARCH AND DEVELOPMENT

Not Applicable.

FIELD OF THE INVENTION

This invention relates generally to distributing data across a plurality of cloud-based storage points, and more particularly, to a system and method for data segmentation and distribution such that the user may distribute their data to a plurality of cloud-based storage points while maintaining data integrity and security.

DISCUSSION OF RELATED ART

Traditionally, businesses, offices, and facilities with multiple computer users and devices implement remote storage to gather data into a single location for all users. As we incorporate more and more devices into our daily lives, individual users begin to find a need for remote data storage, where all devices can access the same data without distributing it individually to each device. Cloud data storage has become a very popular option for both individuals and business seeking remote storage solutions.

Cloud storage can generally be understood as the storage of data in a remote location (ie. not on the local device), where the data is transferred over a network or through the internet. The data in these remote locations is stored on files servers and is typically accessed by customers by authenticating a user account associated with their data. These cloud accounts have defined storage space limitations, and the speed of a cloud storage solution depends on the proximity and bandwidth between the user and the server. User can access their files on any device once their account is authenticated, eliminating many data fragmentation problems they may otherwise face.

Encryption can generally be described as the protection of data through the encoding of information that permits it to be accessed only authorized users. Encryption, however, does nothing to prevent the data from being intercepted by others. Rather, it blocks the data from being read, by turning it into unintelligible gibberish. When information is unencrypted, it is called plaintext. Once this plaintext is processed using an encryption algorithm, it then becomes ciphertext and cannot be read without being decrypted. This is done by using the encryption key generated by an encryption algorithm. Though some encrypted information might be decrypted without a key, in robust systems supported by large computational resources, such unauthorized interception is almost impossible.

While current cloud-based storage solutions are capable of storing data remotely, they do not provide robust security and encryption solutions for end users. Therefore, a need exists for a system and method for data segmentation and distribution such that the user may distribute their data to a plurality of cloud-based storage points while maintaining data integrity and security. The present invention satisfies these needs.

SUMMARY OF THE INVENTION

The present invention will provide a system and method for data segmentation and distribution such that the user may distribute their data to a plurality of cloud-based storage points while maintaining data integrity and security. This is accomplished by incorporating a segmentation module, an encryption module, a distribution module, a rendering module, and a sharing module. These modules work in conjunction to distribute data over several cloud-based storage services while also providing security features and increased speed.

When in use, the user will enter their credentials to access their account. Within the client the user will also enter their credentials for each remote cloud storage service they would like to utilize within the client. At this point the client, by means of API/back end infrastructure, will establish a static connection to the application by means of a secure POST and token transaction. The present invention will then continually test the available internet connectivity for integrity and latency, notifying the user and auto-disabling data synchronization in the event of connectivity disruption. Upon file introduction to the client, the file is segmented, with a checksum file created and preserved by the client, where the user data is then encapsulated and encrypted with 256 AES at which time, through secure POST transactions are distributed to user chosen cloud storage points.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
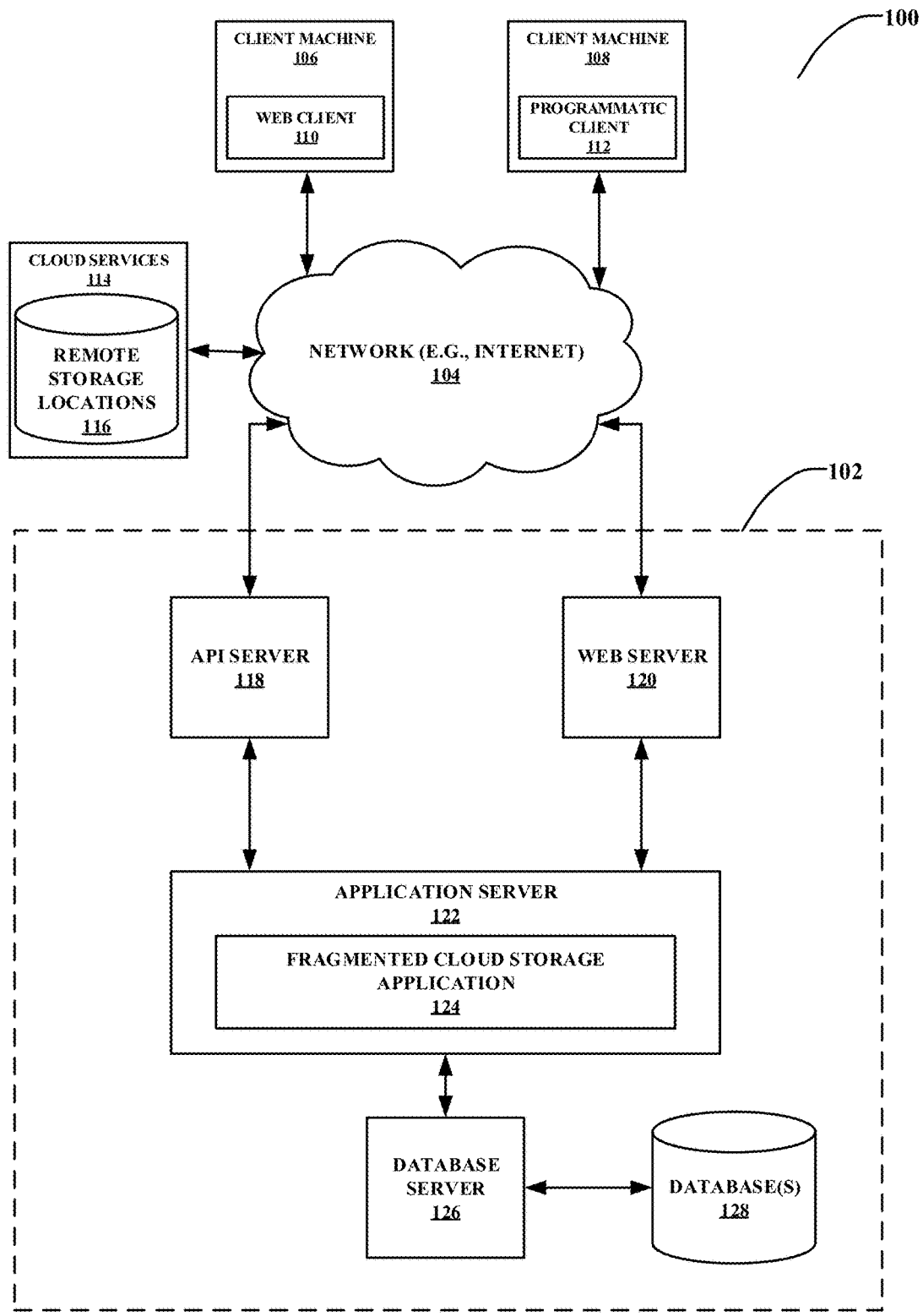
FIG. 1 is a block diagram of a computer system suitable for implementing aspects of the present invention.
Figure 2:
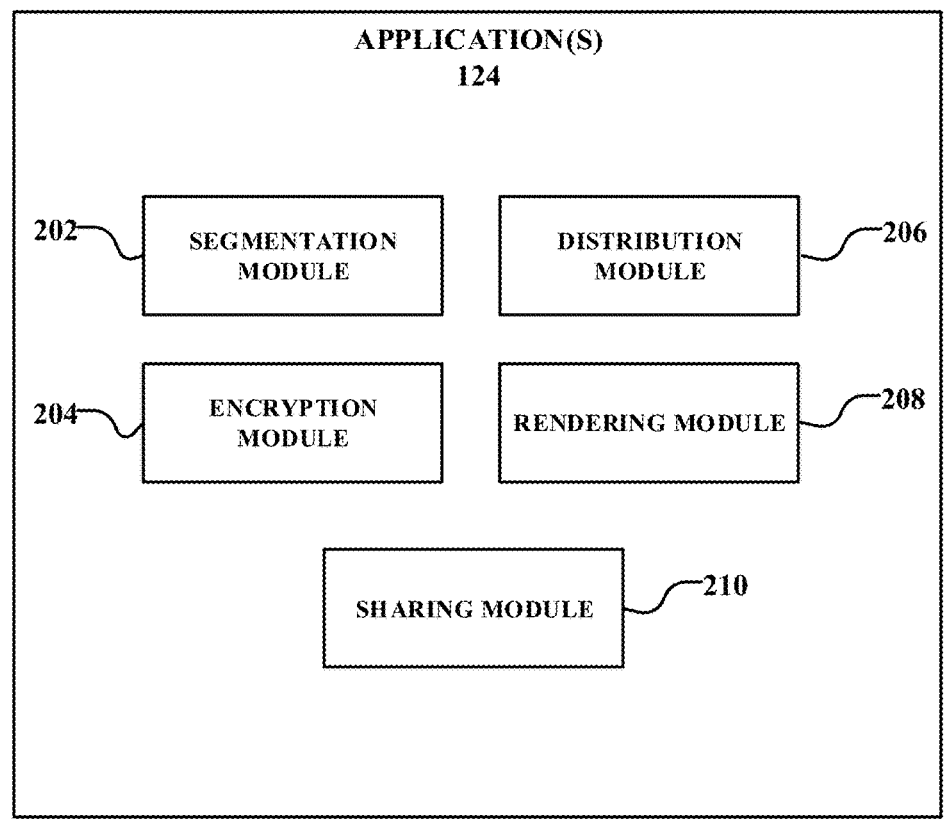
FIG. 2 is a diagram illustrating the modules of the present invention.
Figure 3:
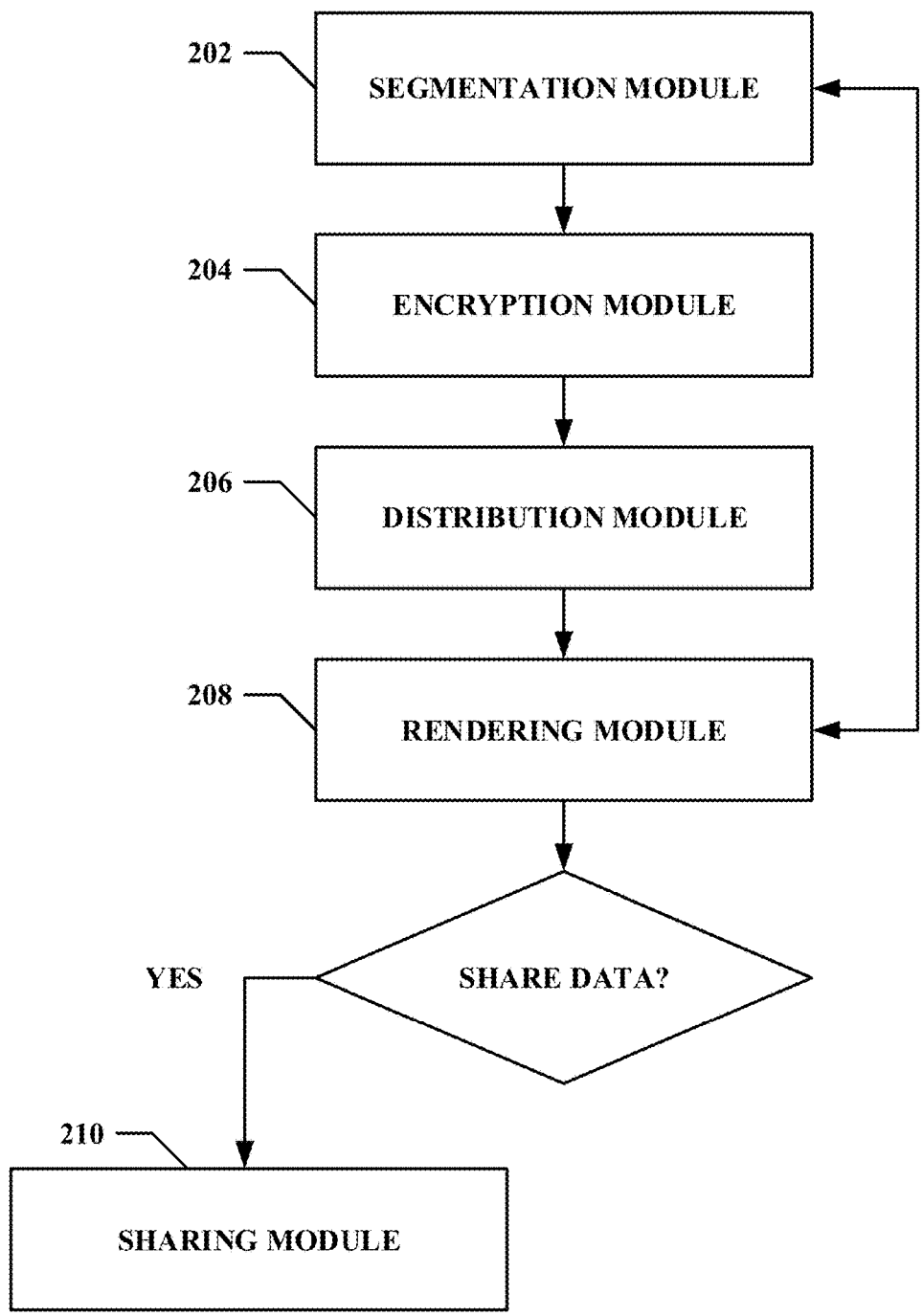
FIG. 3 is a flowchart illustrating the module flow of the present invention.
Figure 4:
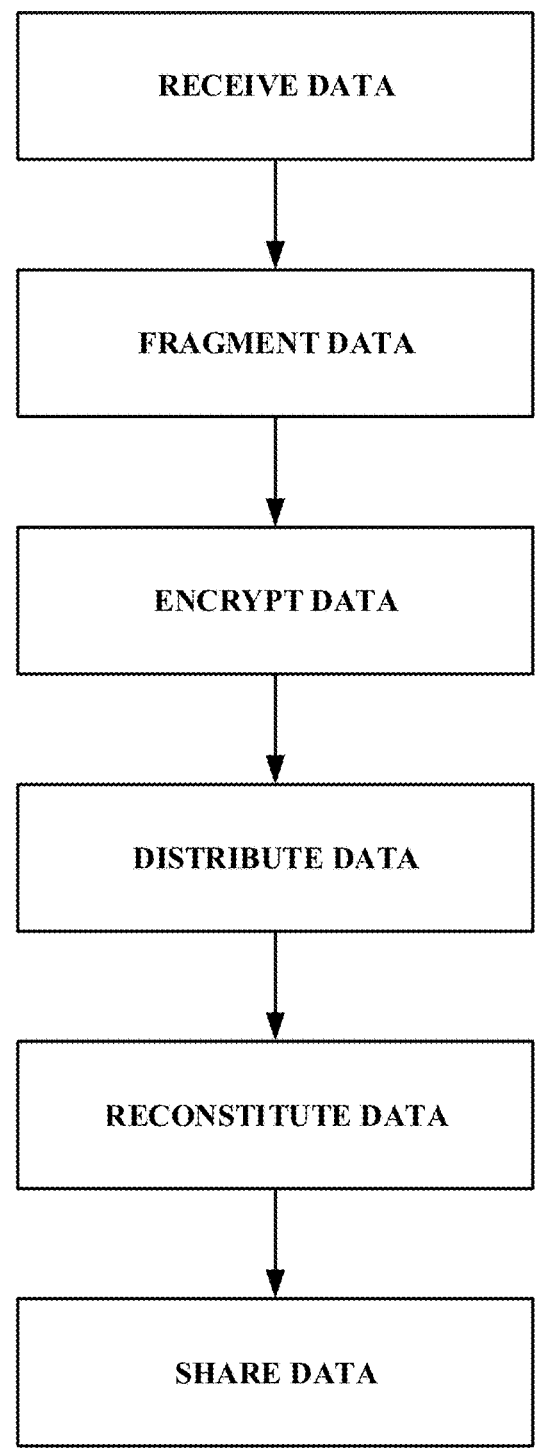
FIG. 4 is a flowchart illustrating the process flow of the present invention.
Figure 5:
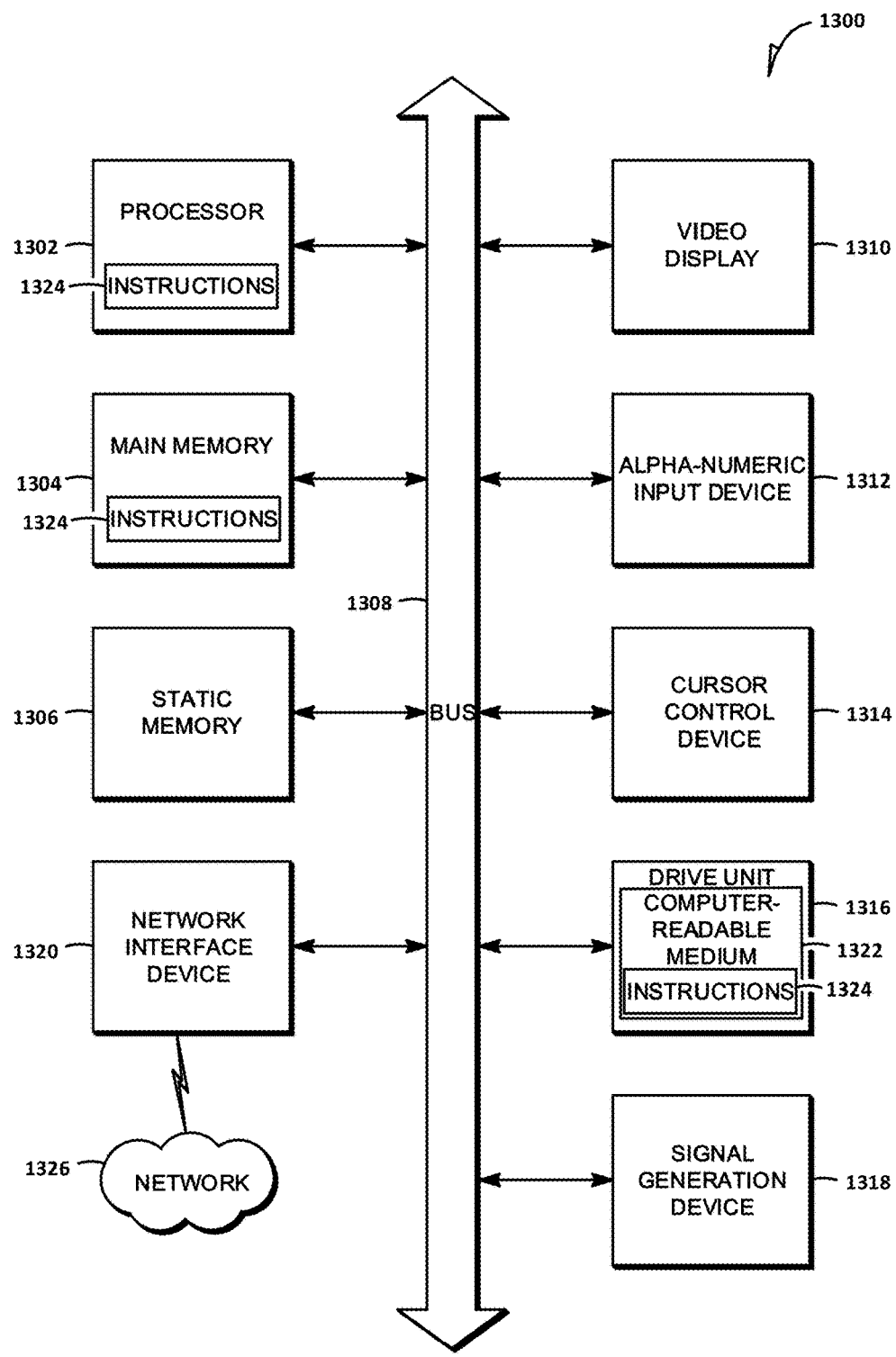
FIG. 5 is a diagram illustrating a computer system suitable for implementing aspects of the present invention.
Figure 6:
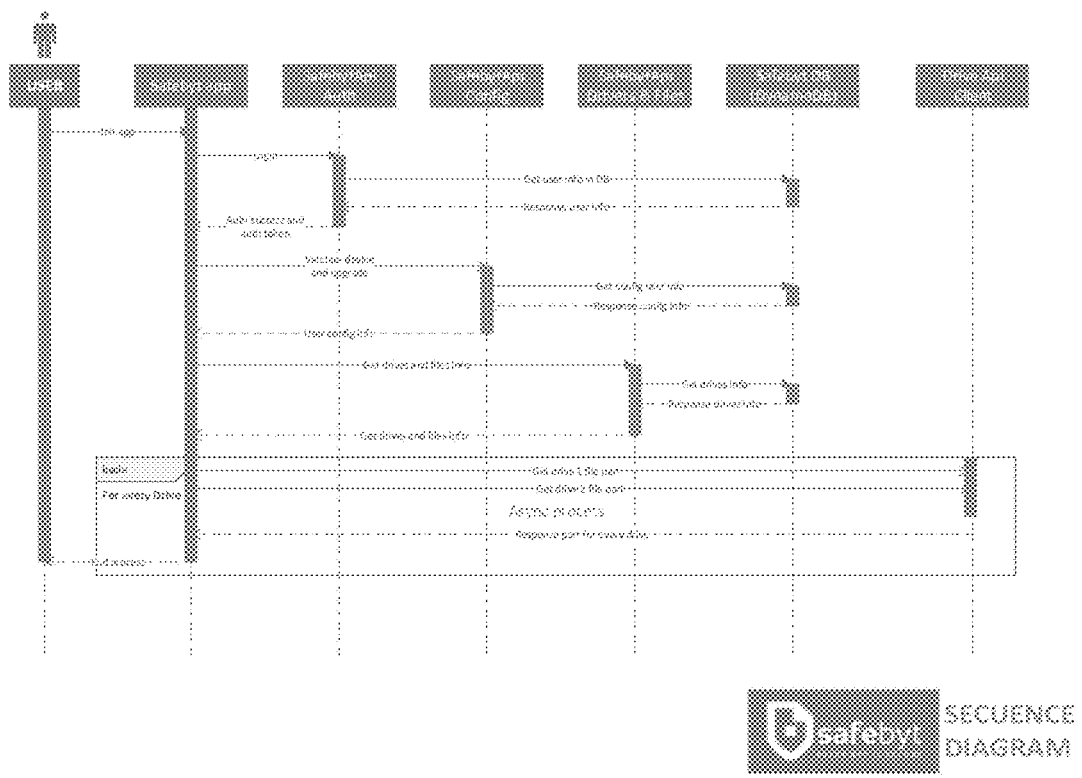
FIG. 6 is a diagram illustrating the sequencing of the present invention.
Figure 7:
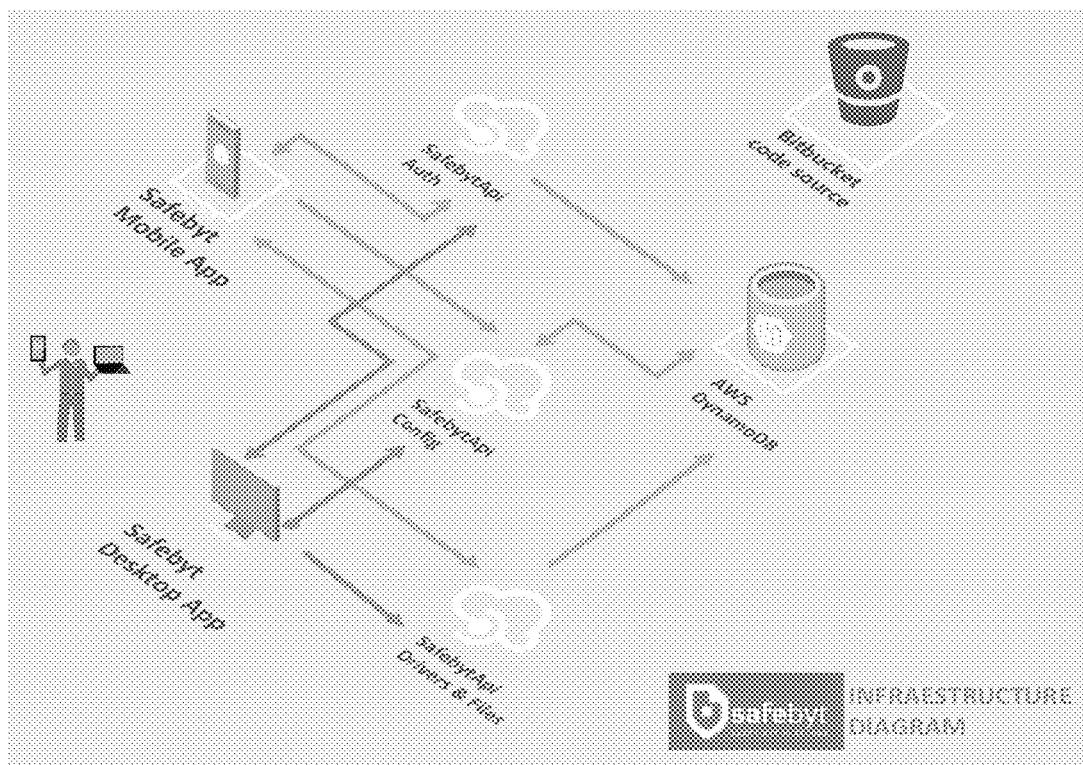
FIG. 7 is a diagram illustrating the infrastructure of the present invention.

FIG. 1 depicts a block diagram of a computer system 100 suitable for implementing aspects of the present invention. As shown in FIG. 1, computer system 100 comprises a server environment 102, which interconnects major subsystems such as an API server 118, web server 120, application server 122, and database server 126 having a storage means 522. The application server 122 consists of several modules 124, and a database 128 exists on the database server 126. Client machines 106 and 108 connect to the server environment 102 through a network 104. Web clients 110 and programmatic clients 112 exist on the client machines 106 and 108, respectively.

The present invention incorporates a plurality of modules 124 for automatically separating, securing, and distributing data over a plurality of remote storage locations 116. Specifically, the present invention comprises a segmentation module 202 for fragmenting user data, an encryption module 204 for securing the user data, a distribution module 206 for allocating the user data over the remote storage locations 116, a rendering module 208 for reconstituting the distributed data, and a sharing module 210 for sharing data amongst clients 106, 108 of the present invention. These modules work in conjunction to distribute user data over several cloud storage services 114 while also providing security features and increased speed.

The segmentation module 202 is based upon erasure coding and Reed-Solomon methods. First, the segmentation module 202 will first receive data from the user. This data can be either automatically received by syncing with a local folder or manually received, either by drag-and-drop, copy-and-paste, through a virtual folder, or by manually selecting the data. The user data can be one or a plurality of files having various file formats. Once the user data is received, the segmentation module 202 will calculate the number of files within the user data, the size of each file, the available remote storage locations, the connection speed to the remote locations, and the storage capacity of each remote location. Using this information, the segmentation module 202 will fragment the files into a plurality of fragmented files, each named and assigned a unique code in a correlative sequence. This process is repeated until there is no available bytes to fragment, where each fragmented piece will have a correlative number (sd1, sd2, sd3, etc.) In a first embodiment, all fragmented files will be the same size (5 kb, 1 Mb, etc.). In an alternative embodiment, the fragmented files will have varying sizes depending on connection speed and space available at each remote storage location 116. A data record will be stored in a file table on the database 128, where a route and unique code for each fragmented file is generated and stored.

The encryption module 204 will receive the fragmented file names and locations for the user data and/or plurality of fragmented files. While separating and distributing data across several remote storage locations 116 does provide a great deal of practical security, data encryption will provide an additional layer that will protect the data from even the most skilled attackers. Here, the encryption module 204 will separately encrypt each file, providing an encryption key that will be stored in the file table and stored on the database 126 of the database server 128. The encryption key may be the same or different for each fragmented file. In an alternative embodiment, the encryption module 204 may encrypt the data before fragmentation, where the segmentation module 202 will then fragment the encrypted data. In yet a further alternative embodiment, a plurality of encryption types may be used for each individual fragment to make decryption more difficult for an attacker.

The distribution module 206 will receive the fragmented and encrypted data, and distribute it between the available remote storage locations 116. The data distribution will follow a priority system, considering several factors when determining where the data will go. First, the segmentation module 202 will calculate and prioritize latency between the remote storage locations 116. More specifically, the latency will be individually tested, where the fastest connections with the lowest latency receive priority. Next, the distribution module 206 will consider the connection speed, or bandwidth, between remote storage locations. Those with the highest bandwidth will receive priority. Last, the distribution module 206 will consider the available space at each cloud service 114. If a cloud service 114 has ample space available, it will receive priority. In an alternative embodiment, the distribution module 206 will work in tandem with the segmentation module 202, where the size and amount of files to fragment the data into are calculated based on the above factors used for distribution. In a further alternative embodiment, redundant fragmented files are stored across several remote storage locations 116 to reduce data loss. More specifically, erasure coding is used incorporating Reed-Solomon code methodology and 256-bit AES encryption through a secure POST and distributed to respective remote storage locations 116 along with respective checksum data.

The rendering module 208 will receive the fragmented and encrypted data that has been distributed to each remote storage location 116 and reconstitute it into its original format. More specifically, the rendering module 208 will retrieve the appropriate fragmented files, unique codes, and encryption keys from the file table and request the corresponding data from each remote storage location 116. The data will be transferred to the client machine 106, 108 in its fragmented and encrypted state. Once all the data is transferred, the rendering module 208 will decrypt and recompile the data for the user.

The sharing module 210 is responsible for sharing data with one or a plurality of authorized users. Here, the sharing module 210 will receive the fragmented data and file table such that it may organize a user's data. If a user would like to share a file, a plurality of files, or a folder with another authorized user, they will make a selection and direct which user they would like the data to be available to. The sharing module 210 will retrieve the appropriate fragmented files, unique codes, and encryption keys from the file table, and send this data to the authorized user. The data will be transferred to them and remain in their fragmented and encrypted state until requested. Once the user requests the data, it will be decrypted and recompiled for the authorized user.

In an alternative embodiment, a compression module is used for reducing the size of the user data. The compression module will receive the fragmented file names and locations for the data received from the user once they are fragmented. Here, the files may be compressed to reduce the file size and bandwidth required for storage and transfer. In the preferred embodiment, the compression module will use lossless compression, as data integrity is paramount. In an alternative embodiment, lossy compression may be used for the appropriate data types (images, audio, etc.). In yet a further alternative embodiment, the compression module may compress the data first before fragmentation, where the segmentation module 202 will then fragment the compressed data after its size is reduced. In still a further alternative embodiment, a plurality of compression types may be used for each individual fragment to make decompression more difficult for an attacker.

When in use, the user will enter their credentials to access their account. Within the client 110, 112 the user will also enter their credentials for each remote cloud storage service 114 they would like to utilize within the client 110, 112. At this point the client 110, 112, by means of API/back end infrastructure 118, will establish a static connection to the application by means of a secure POST and token transaction. The present invention will then continually test the available internet connectivity 104 for integrity and latency, notifying the user and auto-disabling data synchronization in the event of connectivity disruption. Upon file introduction to the client 110, 112, the file is segmented, with a checksum file created and preserved by the client 110, 112, where the user data is then encapsulated and encrypted with 256 AES at which time, through secure POST transactions are distributed to user chosen cloud storage points 114.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A segmented cloud storage system, comprising:
    a segmentation module configured to fragment user data into a plurality of fragmented files using Reed-Solomon methods, said segmentation module further comprising calculating the number of files within the user data, the size of each file, the available remote storage locations, the connection speed and latency of each remote location, the storage capacity of each remote location, and checksum data;
    an encryption module configured to secure said user data, wherein said encryption module further comprises encrypting and encapsulating said user data using at least AES encryption either prior to fragmentation and storing an encryption key in a file table, or using at least AES encryption after fragmentation and storing an encryption key in a file table, and wherein a plurality of encryption types are used for each file;
    a distribution module configured to allocate said plurality of fragmented files between a plurality of remote storage locations, said distribution module further comprising transmitting said plurality of fragmented files to a plurality of remote storage locations and storing their corresponding locations in a file table;
    a rendering module configured to reconstitute said plurality of fragmented files into their original data format, said rendering module further comprising retrieving the appropriate fragmented files, unique codes, and encryption keys from the file table and requesting the corresponding data from each remote storage location; and
    a sharing module configured to share said plurality of fragmented files between users;
    wherein said user data is fragmented, encrypted, and distributed to a plurality of remote locations through a plurality of cloud storage services and made available to one or a plurality of users.

2. The segmented cloud storage system of claim 1, wherein said segmentation module further comprises fragmenting the files into a plurality of fragmented files, each named and assigned a unique code in a correlative sequence until all user data has been fragmented, wherein each of said plurality of fragmented files will have a correlative number, and wherein a data record will be stored in a file table on a database, where a route and unique code for each of said plurality of fragmented files is generated and stored.

3. The segmented cloud storage system of claim 2, wherein said plurality of fragmented files are the same size.

4. The segmented cloud storage system of claim 1, further comprising transferring said plurality of fragmented filed to the client machine in its fragmented and encrypted state and decrypting and recompiling said user data.

5. The segmented cloud storage system of claim 1, further comprising calculating the latency between each of said plurality of remote storage locations and prioritizing data transmission based on said latency.

6. The segmented cloud storage system of claim 1, further comprising calculating the network bandwidth between each of said plurality of remote storage locations and prioritizing data transmission based on said network bandwidth.

7. The segmented cloud storage system of claim 1, further comprising calculating the available storage space between each of said plurality of remote storage locations and prioritizing data transmission based on said available storage space.

8. The segmented cloud storage system of claim 1, wherein said segmentation module further comprises storing redundant fragmented files across said remote storage locations to reduce the risk of data loss.

9. The segmented cloud storage system of claim 1, wherein said sharing module further comprises sharing a file table with one or a plurality of users comprising storage locations, decryption data, and defragmenting data of said plurality of fragmented files, wherein said file table enables said one or a plurality of users to view the original user data.

10. A processor-implemented method for segmented cloud storage, the method comprising:
fragmenting user data user data into a plurality of fragmented files using Reed-Solomon methods and checksum data;
encrypting said user data, wherein said encryption further comprises encrypting and encapsulating said user data using at least AES encryption either prior to fragmentation and storing an encryption key in a file table, or using at least AES encryption after fragmentation and storing an encryption key in a file table, and wherein a plurality of encryption types are used for each file;
allocating said plurality of fragmented files between a plurality of remote storage locations;
reconstituting said plurality of fragmented files into their original data format; and
sharing said plurality of fragmented files between users;
wherein said user data is fragmented, encrypted, and distributed to a plurality of remote locations through a plurality of cloud storage services and made available to one or a plurality of users.

11. The method of claim 10, wherein said fragmenting user data into a plurality of fragmented files further comprises naming and assigned a unique code to each of said plurality of fragmented files in a correlative sequence until all user data has been fragmented, wherein each of said plurality of fragmented files will have a correlative number, and wherein a data record will be stored in a file table on a database, where a route and unique code for each of said plurality of fragmented files is generated and stored.

12. The method of claim 10, further comprising transmitting said plurality of fragmented files to a plurality of remote storage locations and storing their corresponding locations in a file table.

13. A non-transitory computer-readable storage medium storing a set of instructions that, when executed by a processor, cause the processor to perform operations, comprising:
fragmenting user data user data into a plurality of fragmented files using Reed-Solomon methods and checksum data;
encrypting said user data, wherein said encryption further comprises encrypting and encapsulating said user data using at least AES encryption either prior to fragmentation and storing an encryption key in a file table, or using at least AES encryption after fragmentation and storing an encryption key in a file table, and wherein a plurality of encryption types are used for each file;
allocating said plurality of fragmented files between a plurality of remote storage locations;
reconstituting said plurality of fragmented files into their original data format; and
sharing said plurality of fragmented files between users;
wherein said user data is fragmented, encrypted, and distributed to a plurality of remote locations through a plurality of cloud storage services and made available to one or a plurality of users.

14. The non-transitory computer-readable storage medium of claim 13, wherein said fragmenting user data into a plurality of fragmented files further comprises naming and assigned a unique code to each of said plurality of fragmented files in a correlative sequence until all user data has been fragmented, wherein each of said plurality of fragmented files will have a correlative number, and wherein a data record will be stored in a file table on a database, where a route and unique code for each of said plurality of fragmented files is generated and stored.

15. The non-transitory computer-readable storage medium of claim 13, further comprising transmitting said plurality of fragmented files to a plurality of remote storage locations and storing their corresponding locations in a file table.

* * * * *